Oct. 6, 1959 — S. L. PASTOR — 2,907,190
FRICTION CLUTCH
Filed June 27, 1957
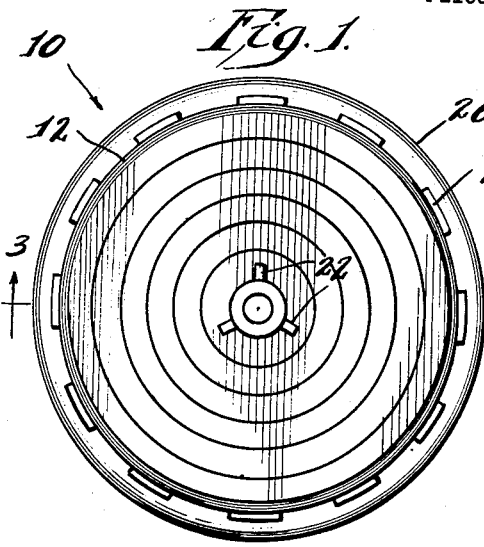
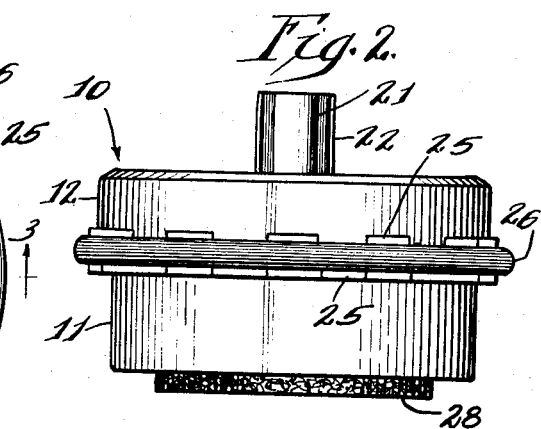
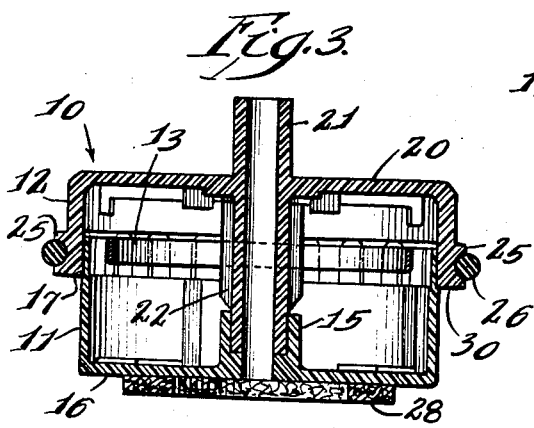
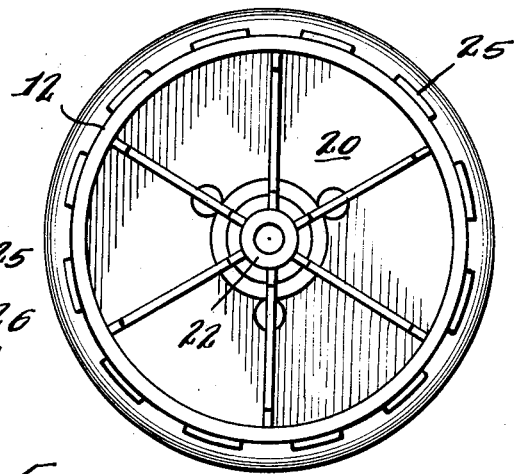
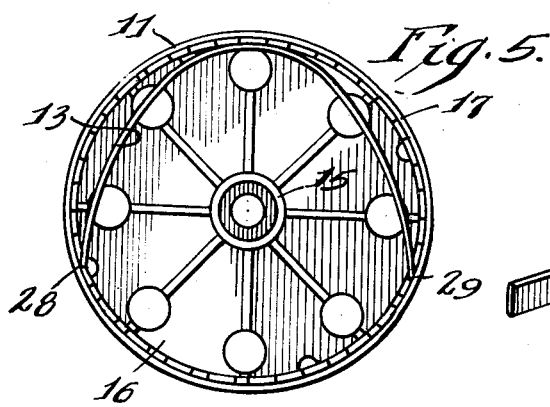
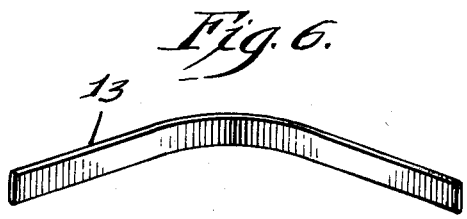
Inventor.
Sheldon Lee Pastor.
By Zabel, Baker, York, Jones & Dithmar
Attorneys.

United States Patent Office 2,907,190
Patented Oct. 6, 1959

2,907,190

FRICTION CLUTCH

Sheldon Lee Pastor, Chicago, Ill., assignor to Revere Camera Company, Chicago, Ill., a corporation of Delaware Application June 27, 1957, Serial No. 668,402

5 Claims. (Cl. 64—30)

This invention relates to a friction clutch of the continuously engaged type.

A continuously engaged friction clutch is used in various kinds of apparatus. As one example, such a clutch is used in conjunction with the reels of a magnetic tape recorder to avoid distortion or breakage of the magnetic tape when tape travel changes from slow to fast speeds, and vice versa. In a clutch of this type it is important that the frictional resistance remain unvarying over an extended period. Ideally, it should remain unvarying for the life of the apparatus.

One object of the invention, therefore, is to provide a friction clutch wherein the frictional resistance afforded thereby will be constant for an indefinite period.

Another object of the invention is to provide such a friction clutch which is subject to inexpensive manufacture and assembly. In preferred form, the present clutch comprises only three elements, two of which may be made of molded plastic material and the third of which may be a simple leaf spring.

Still another object is to provide a friction clutch wherein the frictional resistance afforded thereby easily may be predetermined and wherein a plurality of such clutches each may be depended on to offer uniform resistance.

Other objects, advantages and details of the invention will be apparent as the description proceeds, reference being had to the accompanying drawing wherein one form of the invention is shown. It is to be understood that the description and drawing are illustrative only and the scope of the invention is to be measured by the appended claims.

In the drawing:

Fig. 1 is a plan view of a clutch embodying the invention;

Fig. 2 is an elevational view of the clutch shown in Fig. 1;

Fig. 3 is a sectional view on line 3—3 of Fig. 1;

Fig. 4 is a bottom plan view of one of the clutch elements, namely a female clutch part;

Fig. 5 is a top plan view of another of the clutch elements, namely a male clutch part, and Fig. 6 is a perspective view of a U-shaped leaf spring which constitutes the third element of the illustrated clutch.

Referring now to the drawing, the illustrated friction clutch is generally designated 10. It includes three main clutch elements, namely a male clutch part 11, a female clutch part 12 and tensioning means which, as here illustrated, takes the form of a U-shaped leaf spring 13.

In its broadest aspect, male clutch part 11 is cylindrical in shape with a wall which is relatively thin and deformable. Part 11 may be made of any suitable material and in any suitable manner. Synthetic plastic material has been found particularly suitable, and both such material and the shape of the part lend themselves to fabrication by molding. Polymeric amide material (nylon) has numerous characteristics which make it particularly desirable for use in male clutch part 11.

As illustrated, male clutch part 11 has a generally circular cup-shape with a recessed boss 15 (Figs. 3 and 5) located centrally of cup bottom 16 on the inside of the cup. The wall at the open end of clutch part 11 is reduced in thickness to provide an external shoulder 17 (Fig. 5), the shoulder 17 serving as a limit to position the following described female clutch part 12 which telescopes male clutch part 11.

Female clutch part 12 in its broadest aspect also is cylindrical in shape with a wall of relatively thin and deformable material which may be molded polymeric amide material. As here illustrated female clutch part likewise is of cup-shape, the wall at the closed end of the cup being designated 20.

Wall 20 has a central boss extending from both surfaces. Outside boss 21 in the illustrated clutch has ribs 22 which interlock with recesses in a reel (not shown) for magnetic tape. Inside boss 22 is of such size and shape to be received within recessed boss 15 of male clutch part 11 when the two parts are assembled. Bosses 15, 21 and 22 may have aligned openings, as shown.

Axially spaced ribs 25 are provided on the exterior of the cylindrical wall of female clutch part 12 to receive a ring 26 of resilient material. Ring 26 serves as a braking element in the illustrated clutch.

Element 28 on the bottom of male clutch part 11 is an annular ring of friction material which establishes a friction drive between the clutch and a uniformly rotating belt driven pulley (not shown) which supports the clutch.

As shown in Fig. 3, male clutch part 11 and female clutch part 12 are assembled together in snugly telescoping manner for a limited axial distance along the respective cylinders. This distance is established by engagement between free end 30 of female clutch part 12 and shoulder 17 on the periphery of male clutch part 11.

Predetermined frictional resistance against relative rotation of the two clutch parts is achieved by distorting the otherwise circular shape of the telescoping portions of the two clutch parts. Suitable resilient means is provided to impart a shape-distorting pressure, and, as here illustrated, this means takes the form of a U-shaped leaf spring 13.

Spring 13 has an unflexed shape as shown in Fig. 6 and an assembled, flexed shape as shown in Fig. 5. The ends of spring 13 bear against spaced interior wall portions 28 and 29 (Fig. 5) of male clutch part 11 and in so doing apply a shape-distorting pressure which imparts a non-circular configuration to the telescoped free ends of the clutch parts 11 and 12. When distorted, the telescoped free ends have the general shape of a modified oval.

Resistance to relative rotation between the two clutch parts is provided mainly by the eccentricity of the telescoped ends of the two clutch parts, this resistance having a constant value as long as means 13 exerts a uniform shape-distorting pressure.

In many applications a lubricant is used between the telescoping surfaces of the two clutch parts.

Many synthetic plastics such as the polymeric amides and other materials possess a "cold flow" characteristic, that is, the material in time takes a shape in response to pressures exerted on it. In view of this characteristic, the long term advantages of the invention may not be obtained merely by molding the two clutch parts, or one of them, to a non-circular configuration. Under extended use the non-circular shape or shapes gradually would change to circular shape and the aforesaid eccentric resistance to relative rotation would be lost. In the present development, the application of pressure to spaced wall portions of one of the clutch parts provides a non-circular configuration which is unaffected by extended usage, thereby preserving the resistance against relative rotation for an indefinite period.

The clutch of this invention might be termed a two-way clutch inasmuch as either clutch part can be the drive member with the other clutch part being the driven member. Either way the resistance to relative movement between the two parts is the same.

As an example, two of these clutches may be used in a magnetic tape recorder such as shown in my prior U.S. Patent No. 2,785,892. One clutch carries the supply tape reel which is keyed to boss 21 on female clutch part 12 and has a drive connection to male clutch part 11 from a source of power for rewind drive. The other clutch carries the take-up tape reel on female clutch part 12 and has selective drive connections to male clutch part 11 from a source of power for normal forward drive and from a source of power for rapid forward drive.

In the case of each clutch there is an occasion when the tape itself drives the clutch, in which case the female clutch part 12 is the drive member. In this instance the tape itself is driven by the other clutch.

Similarly, in the case of each clutch there is an occasion (rewind or rapid forward drive) when male clutch part 11 drives the clutch, as for example by means of a driven friction roller engaging the periphery of male clutch part 11. Clutch slippage at the initiation of a rapid drive function precludes a distorting or fracturing tape stress. For normal forward drive of the take-up tape reel, a belt-driven member supports the clutch, and male clutch part 11 is driven thereby through the frictional relationship provided by annular friction element 28.

As will be understood, female clutch part 12 of both clutches is subject to braking action at various times which effects a sudden reversal between the two clutch parts 11 and 12 as far as drive and driven characteristics are concerned. Thus, neither clutch part always is the drive or driven member when the clutches are used in a magnetic tape recorder.

From the above description it is thought that the construction and advantages of the invention will be readily apparent to those skilled in the art. Various changes in detail may be made without departing from the spirit or losing the advantages of the invention.

Having thus described my invention, what I claim as new and desire to secure by Letters Patent is:

1. A friction clutch comprising a generally circular male clutch part of cup-shape, a generally circular female clutch part of cup-shape, the open ends of said clutch parts snugly telescoping one another for limited axial distance, said clutch parts having relatively thin and deformable walls of polymeric amide material, and a U-shaped leaf spring within said male clutch part and bearing against spaced wall portions thereof with a shape-distorting pressure whereby a non-circular configuration is imparted to the telescoping portions of said clutch parts, said configuration providing predetermined resistance to relative rotation of said clutch parts.

2. A friction clutch comprising a cylindrical male clutch part, a cylindrical female clutch part, open ends of said clutch parts snugly telescoping one another for limited axial length, said clutch parts having relatively thin and deformable walls of polymeric amide material, and a U-shaped leaf spring within said male clutch part and bearing against spaced wall portions thereof with shape-distorting pressure whereby a non-circular configuration is imparted to the telescoping portions of said clutch parts, said configuration providing predetermined resistance to relative rotation of said clutch parts.

3. A friction clutch comprising a cylindrical male clutch part, a cylindrical female clutch part, open ends of said clutch parts snugly telescoping one another for limited axial length, said clutch parts having relatively thin and deformable walls of polymeric amide material, and resilient means within said male clutch part and bearing against spaced wall portions thereof with shape-distorting pressure whereby a non-circular configuration is imparted to the telescoping portions of said clutch parts, said configuration providing predetermined resistance to relative rotation of said clutch parts.

4. A friction clutch comprising a cylindrical male clutch part, a cylindrical female clutch part, open ends of said clutch parts snugly telescoping one another for limited axial length, said clutch parts having relatively thin and deformable walls of sheet material, and resilient means within said male clutch part and bearing against spaced wall portions thereof with shape-distorting pressure whereby a non-circular configuration is imparted to the telescoping portions of said clutch parts, said configuration providing predetermined resistance to relative rotation of said clutch parts.

5. A friction clutch comprising a cylindrical male clutch part, a cylindrical female clutch part, open ends of said clutch parts snugly telescoping one another for limited axial length, said clutch parts having relatively thin and deformable walls of sheet material, and means within one of said clutch parts bearing against spaced wall portions thereof with shape-distorting pressure whereby a non-circular configuration is imparted to the telescoping portions of said clutch parts, said configuration providing predetermined resistance to relative rotation of said clutch parts.

References Cited in the file of this patent

UNITED STATES PATENTS

| | | |
|---|---|---|
| 1,046,474 | Marcuse | Dec. 10, 1912 |
| 1,532,464 | Woodward | Apr. 7, 1925 |
| 2,002,699 | Larsen | May 28, 1935 |

FOREIGN PATENTS

| | | |
|---|---|---|
| 9,646 | Norway | July 1, 1901 |